United States Patent [19]
Cline et al.

[11] 3,899,361
[45] Aug. 12, 1975

[54] STABILIZED DROPLET METHOD OF MAKING DEEP DIODES HAVING UNIFORM ELECTRICAL PROPERTIES

[75] Inventors: Harvey E. Cline; Thomas R. Anthony, both of Schenectady, N.Y.

[73] Assignee: General Electric Company, Schenectady, N.Y.

[22] Filed: Oct. 30, 1973

[21] Appl. No.: 411,008

[52] U.S. Cl. ................. 148/1.5; 148/171; 148/172; 148/173; 148/186; 148/187; 148/188; 148/177; 148/179; 252/62.3 GA; 252/62.3 E
[51] Int. Cl. ............................................ H01l 7/34
[58] Field of Search..... 148/1.5, 177, 179, 171–173, 148/186–188; 252/62.3 GA, 62.3 E

[56] References Cited

UNITED STATES PATENTS

| | | | |
|---|---|---|---|
| 2,813,048 | 11/1957 | Pfann | 148/1 |
| 3,205,101 | 9/1965 | Mlavsky et al. | 148/1.5 X |
| 3,226,265 | 12/1965 | Renschel et al. | 148/1.5 |
| 3,360,851 | 1/1968 | Kahng et al. | 148/188 X |
| 3,476,592 | 11/1969 | Berkenblit et al. | 148/1.6 X |
| 3,671,339 | 6/1972 | Tateno et al. | 148/179 |

*Primary Examiner*—G. Ozaki
*Attorney, Agent, or Firm*—Charles T. Watts; Joseph T. Cohen; Jerome C. Squillaro

[57] ABSTRACT

Erratic electrical properties of a product made by the thermal gradient zone melting method can result from the physical instability of the migrating metal-rich liquid droplets. By limiting droplet size to a maximum cross-sectional dimension of one millimeter, this cause of defective products can be eliminated.

10 Claims, 8 Drawing Figures

STABILIZED DROPLET METHOD OF MAKING DEEP DIODES HAVING UNIFORM ELECTRICAL PROPERTIES

The present invention relates generally to the art of thermal gradient zone melting and is more particularly concerned with a novel method of consistently producing semiconductor devices having P-N junctions and other junctions between the matrix crystal and recrystallized material therein which are uniform and free fron junction-bridging fragments of migrated material and as a result have ideal electrical characteristics.

CROSS REFERENCES

This invention is related to those of the following patent applications assigned to the assignee hereof and filed of even date herewith:

Patent application Ser. No. 411,150, filed Oct. 30, 1973, entitled "Method of Making Deep Diode Devices" in the names of Thomas R. Anthony and Harvey E. Cline, which discloses and claims the concept of embedding or depositing the solid source of the migrating species within the matrix body instead of on that body to overcome the tendency for migration to be irregular and to lead to non-uniformity in location and spacing of the desired P-N junctions.

Patent application Ser. No. 411,015, filed Oct. 30, 1973, entitled "High Velocity Thermomigration Method of Making Deep Diodes" in the names of Harvey E. Cline and Thomas R. Anthony, which discloses and claims the concept of carrying out thermal gradient zone melting at relatively high temperatures including temperatures approaching the melting point temperature of the material of the matrix body.

Patent application Ser. No. 411,021, filed Oct. 30, 1973, entitled "Deep Diode Device Production Method" in the names of Harvey E. Cline and Thomas R. Anthony, which discloses and claims the concept of using the high velocity thermomigration method to produce migration trails of recrystallized material running lengthwise of an elongated matrix body and then dividing the matrix into a number of similar deep diodes by cutting the matrix body transversely at locations along the length of the migration trails.

Patent application Ser. No. 411,009, filed Oct. 30, 1973, entitled "Deep Diode Device Having Dislocation-Free P-N Junctions and Method" in the names of Thomas R. Anthony and Harvey E. Cline, which discloses and claims the concept of minimizing the random walk of a migrating droplet in a thermal gradient zone melting operation by maintaining a thermal gradient a few degrees off the <100> axial direction of the crystal matrix body and thereby overwhelming the detrimental dislocation intersection effect.

Patent application Ser. No. 411,001, filed Oct. 30, 1973, entitled "Deep Diode Devices and Method and Apparatus" in the names of Thomas R. Anthony and Harvey E. Cline, which discloses and claims the concept of maintaining a finite thermal gradient in the direction of droplet travel while maintaining a zero thermal gradient in a direction normal to the droplet travel course.

BACKGROUND OF THE INVENTION

Recognizing two decades ago the considerable advantages of the thermal gradient zone melting (TGZM) technique over the commercially established diffusion and epitaxial methods of semiconductor device production, a number of those skilled in the art sought to solve the problems barring the practicable use of TGZM for that purpose. No real success was ever achieved in any of those efforts to the best of our knowledge and no commercially feasible operation of this type existed prior to that which is based upon our invention and discoveries disclosed and claimed in the above-referenced copending applications.

Earlier efforts used relatively large liquid zone masses and thus relatively large liquid zone widths because of the ease of handling and implanting metal wires and pellets of a relatively large size in a semiconductor body to form the initial liquid zones. When such relatively large liquid zones are used in the thermal gradient zone melting technique, we have found that P-N junctions with either high leakage and/or non-rectifying ohmic electrical characteristics are produced.

By using photolithographic and other techniques discussed in our copending applications Ser. Nos. 411,150 and 411,001, it became possible and feasible to explore the thermal gradient zone melting technique using a new range of relatively small liquid zone sizes to see if the deficiencies of the electrical characteristics of the P-N junctions formed by the prior thermal gradient zone melting art could be overcome in this novel liquid zone size range.

SUMMARY OF THE INVENTION

We have discovered that semiconductor devices free from junction shorts and otherwise having substantially uniform electrical characteristics can be consistently produced through the use of droplets of relatively small size by a combination of the methods of the above-referenced applications.

We have further discovered that in the production of semiconductor devices, migrating droplet cross-sectional size is critically related to droplet stability. Particularly, instability results when the maximum droplet width exceeds 1 millimeter. By "droplet" width, we mean the largest cross-sectional dimension of the droplet perpendicular to the thermal gradient. The droplet cross section may be elongated, square, triangular, circular, hexagonal or diamond shape. For droplet migration rates of $10^{-7}$ to $5 \times 10^{-4}$ centimeters per second, thermal gradients through the matrix body up to 300°C per centimeter, composition of the metal-rich liquid droplet, and other such parameters in silicon, this instability criterion of 1 millimeter holds.

Surprisingly, we have found that droplets of far less total thickness and thus far less total mass are invariably unstable during migration if they measure more than 1 millimeter in maximum cross-sectional width.

Briefly described, the novel method of this invention based on all these discoveries of ours comprises providing as the migrating material a liquid body of metal-rich solution of matrix semiconductive material having a maximum cross-sectional dimension less than about 1 millimeter, and migrating the liquid body through the matrix body in a straight line from one location to another under the driving force of a thermal gradient. The resulting migration trail in the form of a recrystallized region of semiconductive material and the matrix body material form a continuous P-N junction that is free from junction-bridging and junction-shorting fragments of the migrated material.

DESCRIPTION OF THE DRAWINGS

The method of this invention is illustrated in the drawings accompanying and forming a part of this specification, in which.

Figure 1:
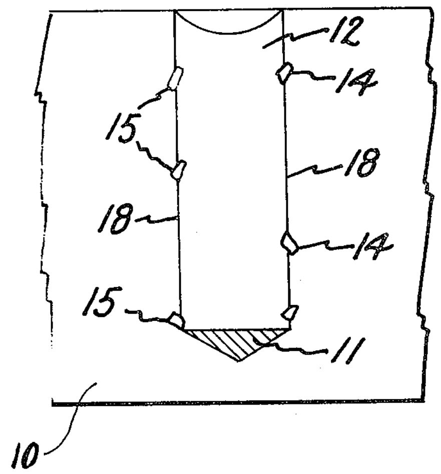
FIG. 1 shows in enlarged vertical cross section the progress of migration of an unstable droplet through a matrix body in the production of a semiconductive device using a prior art TGZM method.

As indicated above and as illustrated in FIG. 1, we have observed that P-N junction shorting in deep diode semiconductor devices is caused by fragments of migrating droplet material breaking away during the migration process and remaining lodged in the wake of the droplet trail across the junction between the recrystallized region and the semiconductor crystal matrix body. Thus, when a silicon single crystal matrix body 10 is subjected to migration of aluminum droplet 11 of width greater than one millimeter, parts of the edges or peripheral portions of the droplet break away and are left behind as shown at 14 and 15. P-N junction 18 marking the boundary or interface between recrystallized region 12 and body 10 consequently is bridged by fragments 14 and 15 at a number of locations along the length of the droplet migration course. The semiconductor device resulting from such droplet instability consequently will have erratic electrical properties and poorly rectifying P-N junctions making it unsuitable for semiconductor applications.

Figure 2:
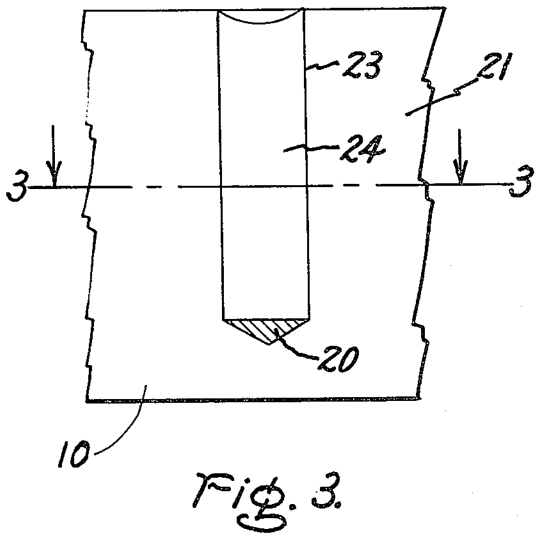
FIG. 2 is a view similar to that of FIG. 1 illustrating droplet migration at an intermediate stage in accordance with the method of this invention.

By contrast, the process of this invention involving the migration of an aluminum droplet 20 of uniform cross-sectional dimension less than 1 millimeter width through a silicon matrix body 21, suitably the same as body 10, results in a device which is eminently qualified for semiconductor uses. Thus, as shown in FIG. 2, junction 23 constituting the interface between recrystallized region 24 and matrix body 21 is entirely free from shorting fragments of migrating droplet 20.

The shorting fragments 15 and 14 of FIG. 1 left behind the unstable migrating droplet 11 resulting from the dropping behind of a thin metal-rich liquid veil from the rear peripheral edge of the droplet during migration of an unstable droplet. This thin veil, in turn, under forces of capillarity breaks up into a myriad of small liquid fragments which after solidification comprise the P-N junction shorting fragments 14 and 15 of FIG. 1. The release of the thin liquid veil from the rear peripheral edge of the unstable droplet occurs because of the difference in the thermal gradient, the driving force for droplet migration, between the center and the edges of the migrating droplet.

Figure 4:
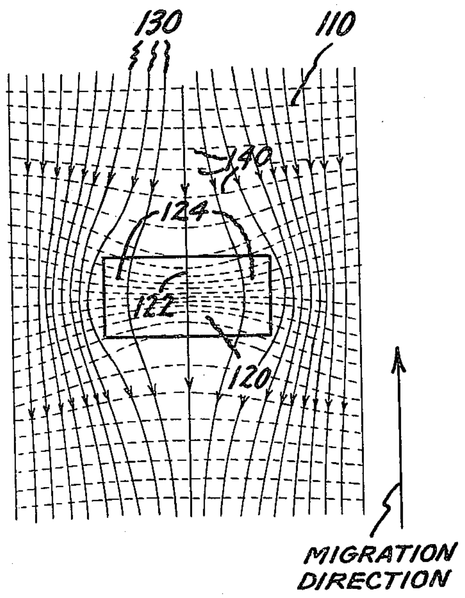
FIG. 4 is a schematic drawing of the heat flow and isotherm lines around a metal-rich liquid droplet in a semiconductor crystal.

FIG. 4 is a schematic diagram of the heat flows 130 and isotherm lines 140 around a migrating liquid body 120 in a semiconductor matrix 110. The particular heat flow and isotherm lines pattern is a consequence of the generally lower thermal conductivity of liquid body 120 as compared to solid body 110 for metal-rich liquid droplets in semiconductor crystals. From FIG. 4 it can be seen that the number of isotherms 140 in the middle 122 of the liquid body exceed the number of isotherms 140 at the edge 124 of the liquid body. In other words, the thermal gradient at the center 122 of the liquid body is greater than the thermal gradient at the edge 124 of the liquid body so that the migration driving force is greater in the middle of the liquid body than at the edges of the liquid body. If the capillarity forces holding the liquid droplet together are insufficient to prevent these unequal forces from breaking apart the droplet, then the droplet will be unstable and the center 122 of the droplet will migrate faster than the edges of the droplet and leave the edges and resulting fragments behind in the P-N junction between the recrystallized material in the trail of the droplet and the original semiconductor matrix.

For small droplets, the ratio of the surface area of the droplet to the volume of the droplet is large. Thus, the ratio of the capillarity forces holding the droplet together (proportional to the surface area) to the migration driving forces (proportional to the volume) are large for small droplets so that the difference in migration driving forces between the middle 122 and edges 124 of a droplet are insufficient to cause a small droplet to break up and disintegrate at its edges. Consequently, the size of a liquid body migrating in a thermal gradient in a semiconductor body will determine its stability. Relatively large liquid bodies like those used in the prior art will tend to break up while relatively small liquid bodies in the size range disclosed in this invention will be stable and will produce P-N junctions free from shorting fragments.

Metal-rich liquid droplets have been found to assume several geometric shapes in diamond cubic semiconductor crystals during our investigations. Since these geometric shapes affect the difference in thermal gradients between the middle and the edges of the liquid droplets, one might expect some difference in a stability criterion between the different shapes. However, since all shapes presented thin edges perpendicular to the thermal gradient, the disparity between the different geometric shapes is small and a single stability criterion can be used for the four different liquid droplet shapes found in our investigations.

Figure 5:
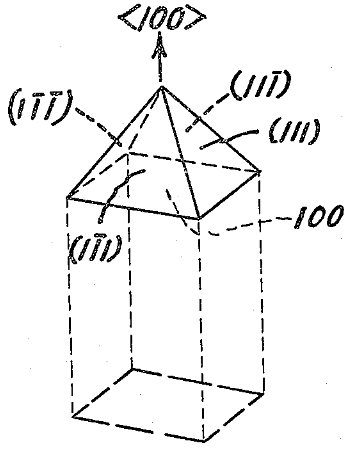
FIG. 5 is an isometric view of the pyramidal shape of a metal-rich liquid droplet migrating in the <100> direction in a diamond cubic semiconductor crystal and the cross-sectional shape of its trail.
Figure 3:
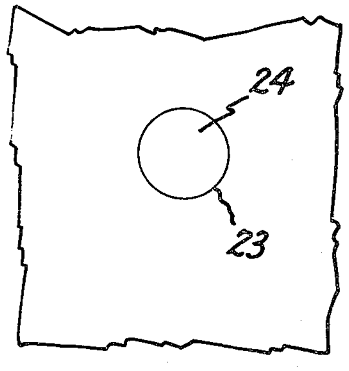
FIG. 3 is a transverse sectional view taken on line 3—3 of FIG. 2 showing the uniform cross-section of the droplet and its trail.
Figure 6:
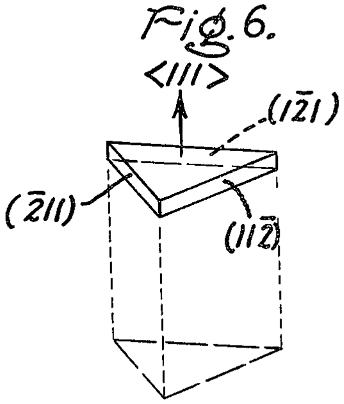
FIG. 6 is an isometric view of the triangular platelet shape of metal-rich liquid droplet migrating in the <111> direction in a diamond cubic semiconductor crystal and the cross-sectional shape of its trail.
Figure 7:
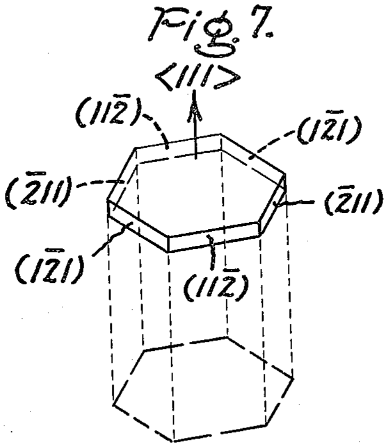
FIG. 7 is an isometric view of a hexagonal platelet, an alternative form to the triangular platelet, of a metal-rich liquid droplet migrating in the <111> direction in a diamond cubic semiconductor crystal and the cross section shape of its trail.
Figure 8:
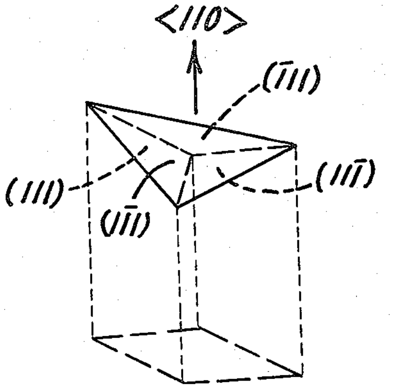
FIG. 8 is an isometric view of a prismatic shape of a metal-rich liquid droplet migrating in the <110> direction in a diamond cubic semiconductor system and the cross section shape of its trail.

FIG. 5 shows the pyramidal shape of aluminumrich liquid droplets migrating in a thermal gradient in the <100> direction in silicon. The pyramidal droplet has four forward (111) planes and a rear (100) plane for its faces. The cross section of the trail is a square. FIG. 6 shows the triangular platelet form of aluminum-rich liquid droplets migrating in the <111> direction in silicon. The forward and rear faces of the platelet are (111) planes while the edges are (112) type planes. The cross section of the droplet trail is a triangle. FIG. 7 shows the hexagonal platelet form of gold-rich liquid droplets migrating in the <111> direction in silicon. Again, the forward and the rear faces are (111) planes while the side faces of the hexagonal platelet are (112) type planes. The cross section of the droplet trail is a triangle. FIG. 8 shows the prismatic form of an aluminum-rich liquid droplet migrating in the <110> direction in silicon. (111) type planes make up all four faces. The cross sectional shape of the trail is a diamond.

In carrying out the process of our present invention illustrated in FIG. 2, the metal droplet source material was provided in the desired pattern in the surface of the silicon matrix body in accordance with the method disclosed and claimed in our copending patent application Ser. No. 411,150. Also, in carrying out this process, the method disclosed and claimed in our copending patent application Ser. No. 411,001 was used to insure migration of the droplets along straight lines so as to maintain the spacing and registry of the initial droplet source pattern.

Preferably, but not necessarily, in the practice of this invention the method disclosed and claimed in our copending patent application Ser. No. 411,015 is used to accelerate the droplet migration process, the lower surface of the silicon matrix body in each instance being maintained during themomigration at a temperature of about 1,200°C and the thermal gradient through the matrix body being maintained at about 50°C per centimeter.

In the case of the <100> migration direction in FIGS. 2 and 5, it is preferable to employ the invention disclosed and claimed in our copending patent application Ser. No. 411,009. Thus, as viewed in FIG. 2, the <100> direction of the crystal 21 was at a slight angle (2 to 10°) from the vertical axis of the recrystallized region in order to avoid displacement of migrating droplet 20 from its intended trajectory by dislocations in the matrix body 21.

The following illustrative examples will further describe this invention and its advantages for the full understanding of those skilled in the art:

EXAMPLE I

Droplets of aluminum were migrated through 1 centimeter of a 10 ohm-centimeter N-type silicon (111) wafer at 1,200°C with a 50°C per centimeter thermal gradient. Sixteen droplets ranging in width between 0.1 and 3.0 mm were produced by evaporation of aluminum into recesses in the surface of the wafer. After migration, the wafer was sectioned 1 millimeter below the surface and stained to reveal the droplet shape. Droplets below 1 millimeter in diameter were triangular in shape while larger droplets were irregular aggregates of triangles.

EXAMPLE II

The above experiment described in Example I was tried with a (100) wafer of silicon. In this case, the droplets were square but the result is essentially the same. Above one millimeter in droplet width, the shape became irregular and multiconnected.

A section parallel to the thermal gradient was cut and polished and the trails of recrystallized material were examined using infrared transmission. In the droplets larger than 1 millimeter in width, metallic inclusions were found. Considerable strain around the inclusions was detected using polarized infrared microscopy. The regular droplets below 1 millimeter did not show metallic inclusions.

The diode characteristics of the P-N junctions formed with stable droplets below 1 millimeter resulted in excellent 400 volt breakdown voltages and low leakage currents. The unstable droplets with metallic inclusions produced diodes with either low breakdown voltages, high leakage current, and/or ohmic non-rectifying junctions.

Instead of silicon, the matrix body may be a diamond cubic semiconductor crystal of germanium or silicon carbide, or a compound of a Group III element and a Group V element, or a compound of a Group II element and a Group VI element.

What we claim as new and desire to secure by Letters Patent of the United States is:

1. The thermal gradient zone melting method of making a semiconductor device which comprises the steps of providing a matrix body of semiconductive material of first-type semiconductivity, providing within the matrix body a liquid body of metal-rich solution of matrix semiconductive material having a maximum width less than 1 millimeter, and migrating the liquid body through the matrix body in a straight line from one location to another under the driving force of a thermal gradient to produce a migration trail in the form of a recrystallized region of semiconductive material of second-type semiconductivity and a continuous junction at the interface between the first-type and the second-type semiconductive materials free from junction-bridging fragments of the migrated material.

2. The method of claim 1 in which the matrix body is a diamond cubic semiconductor crystal selected from the group consisting of silicon, germanium, silicon carbide, a compound of a Group III element and a Group V element, and a compound of a Group II element and a Group VI element.

3. The method of claim 2 in which the matrix body is a silicon crystal and the metal of the metal-rich liquid body is aluminum.

4. The method of claim 3 in which the temperature gradient ranges up to 300°C per centimeter, and in which the velocity of the migrating liquid body ranges between $10^{-7}$ centimeters per second and $5 \times 10^{-4}$ centimeters per second.

5. The method of claim 2 in which the liquid body is a droplet.

6. The method of claim 5 in which the droplet is a triangular platelet lying in a (111) plane and is migrating in the <111> direction.

7. The method of claim 5 in which the droplet is a four-sided pyramid bounded by four (111) type planes on its forward faces and by a (100) plane on its rear face and is migrating within 10° of the <100> direction.

8. The method of claim 5 in which the droplet is a prism bounded by four types of (111) planes and migrating in the <110> direction.

9. The method of claim 5 in which the liquid body is a hexagonal platelet lying in a (111) plane and migrating in a <111> direction.

10. The method of claim 1 in which the metal of the metal-rich liquid body is gold.

* * * * *